Figure 1:
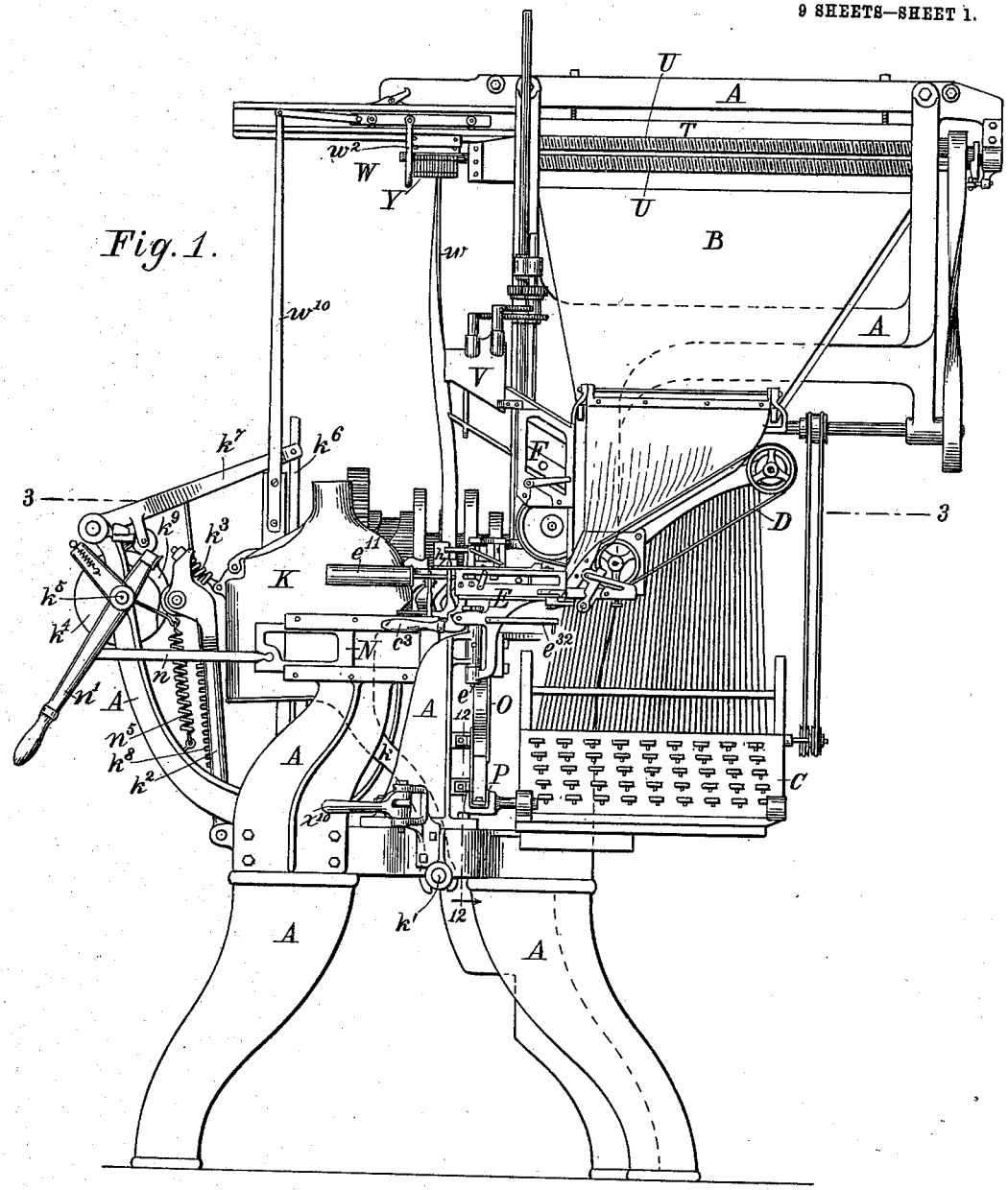

No. 734,746. PATENTED JULY 28, 1903.
D. A. POE & W. H. SCHARF.
LINOTYPE MACHINE.
APPLICATION FILED JAN. 15, 1903.
NO MODEL. 9 SHEETS—SHEET 1.

WITNESSES:
W. R. Kennedy
A. M. E. Kennedy

INVENTORS.
D. A. Poe
W. H. Scharf
BY Phil T. Dodge
ATTORNEY

No. 734,746. PATENTED JULY 28, 1903.
D. A. POE & W. H. SCHARF.
LINOTYPE MACHINE.
APPLICATION FILED JAN. 15, 1903.
NO MODEL. 9 SHEETS—SHEET 2.

WITNESSES:
INVENTORS.
BY
ATTORNEY

No. 734,746. PATENTED JULY 28, 1903.
D. A. POE & W. H. SCHARF.
LINOTYPE MACHINE.
APPLICATION FILED JAN. 15, 1903.

NO MODEL. 9 SHEETS—SHEET 3.

WITNESSES:
W. R. Kennedy
A. M. E. Kennedy

INVENTORS.
D. A. Poe
W. H. Scharf
BY
Phil T. Dodge
ATTORNEY.

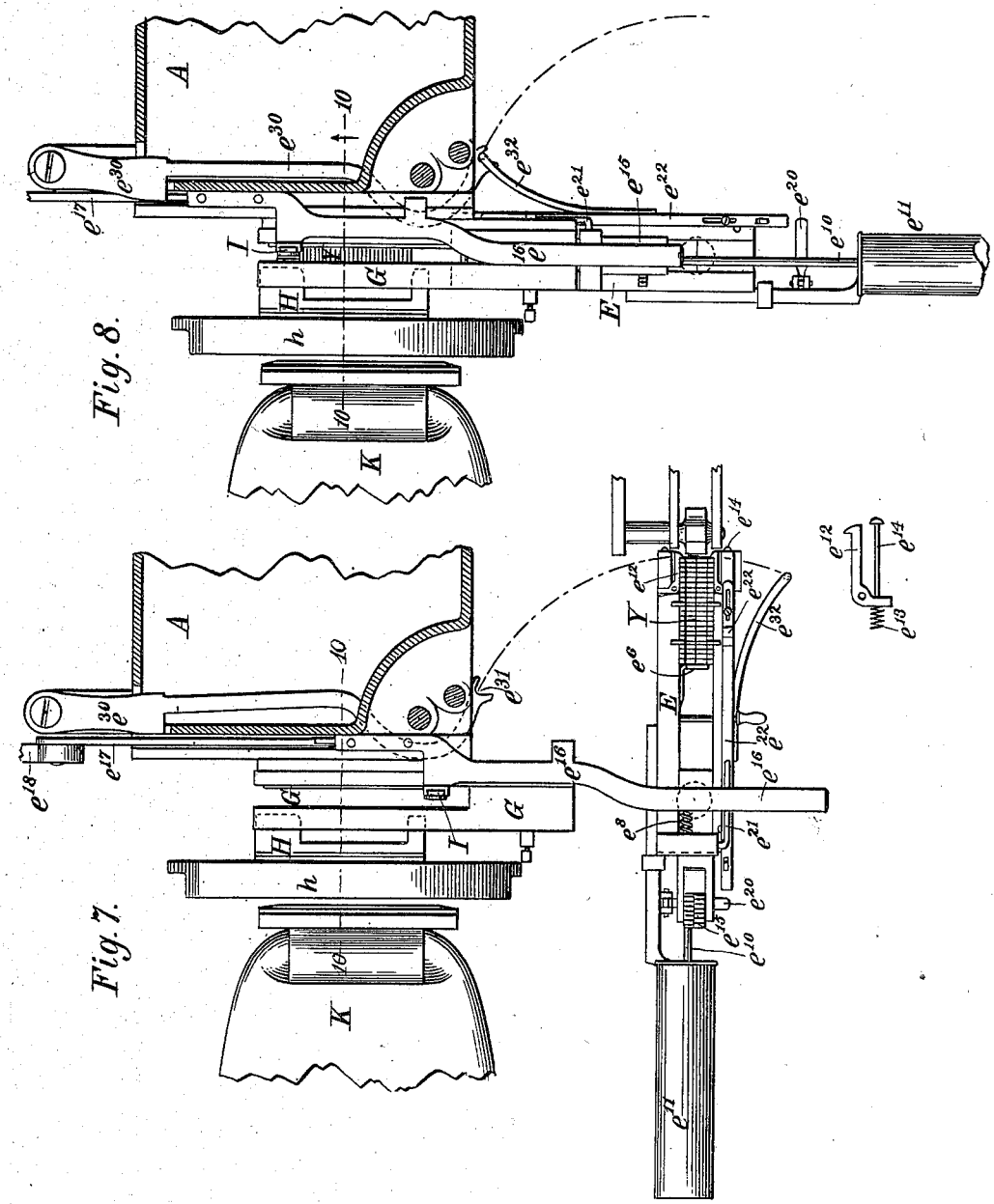

No. 734,746. PATENTED JULY 28, 1903.
D. A. POE & W. H. SCHARF.
LINOTYPE MACHINE.
APPLICATION FILED JAN. 15, 1903.
NO MODEL. 9 SHEETS—SHEET 5.
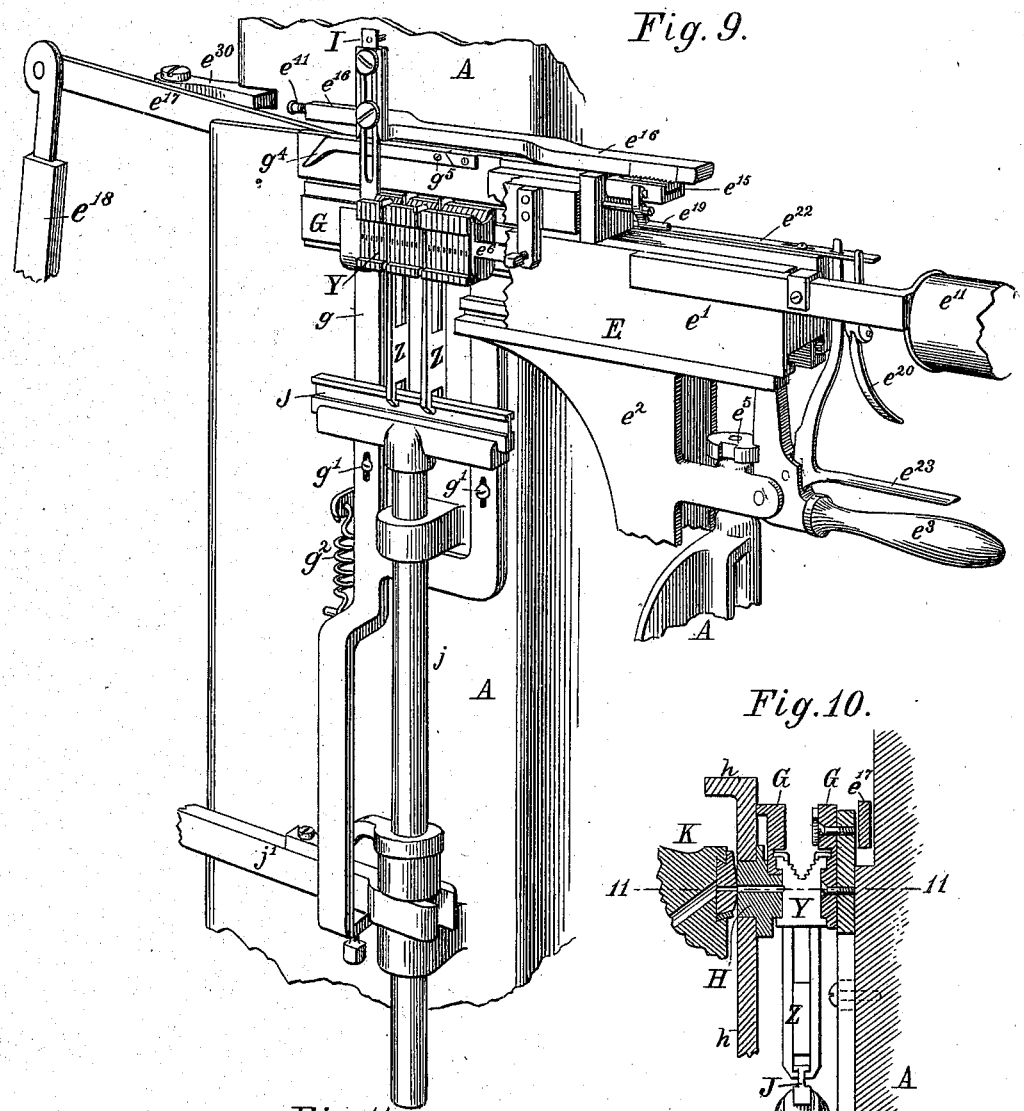
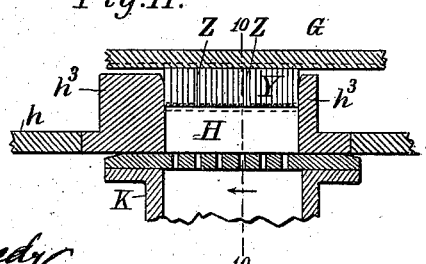
WITNESSES: INVENTORS.

No. 734,746. PATENTED JULY 28, 1903.
D. A. POE & W. H. SCHARF.
LINOTYPE MACHINE.
APPLICATION FILED JAN. 15, 1903.
NO MODEL. 9 SHEETS—SHEET 6.
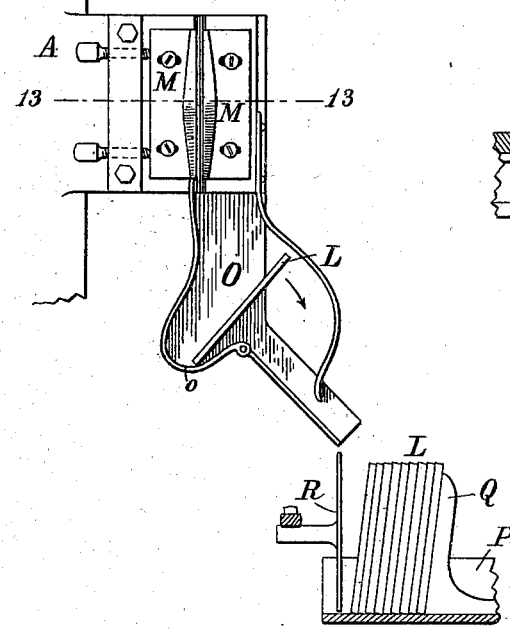
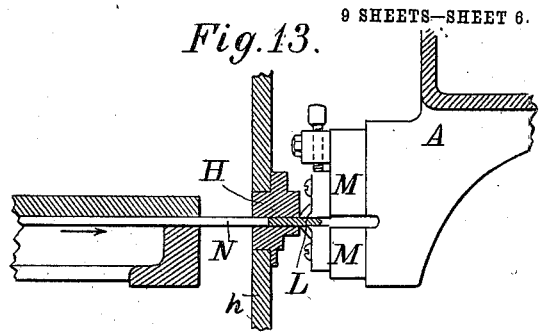
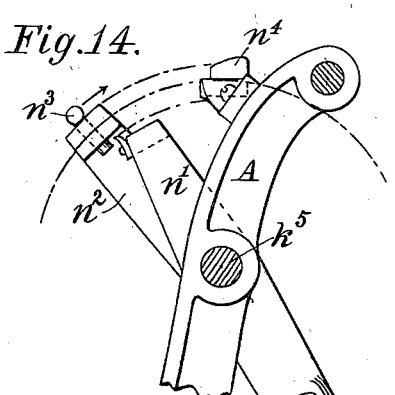
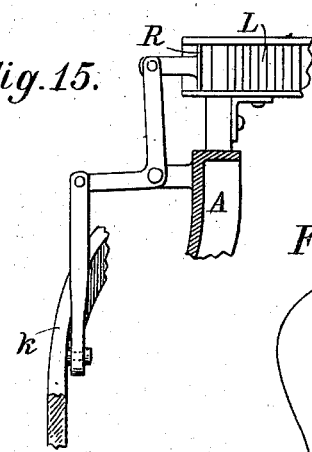
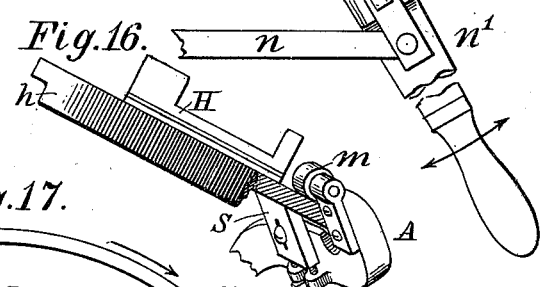
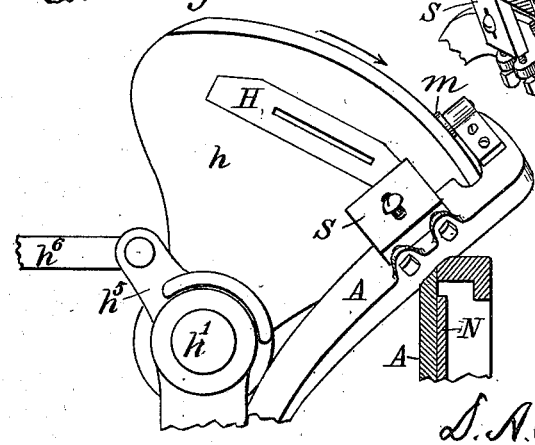
WITNESSES:
W. R. Kennedy
A. M. E. Kennedy
INVENTORS.
D. A. Poe
W. H. Scharf
BY
Phil. T. Dodge
ATTORNEY No. 734,746. PATENTED JULY 28, 1903.
D. A. POE & W. H. SCHARF.
LINOTYPE MACHINE.
APPLICATION FILED JAN. 15, 1903.
NO MODEL. 9 SHEETS—SHEET 7.
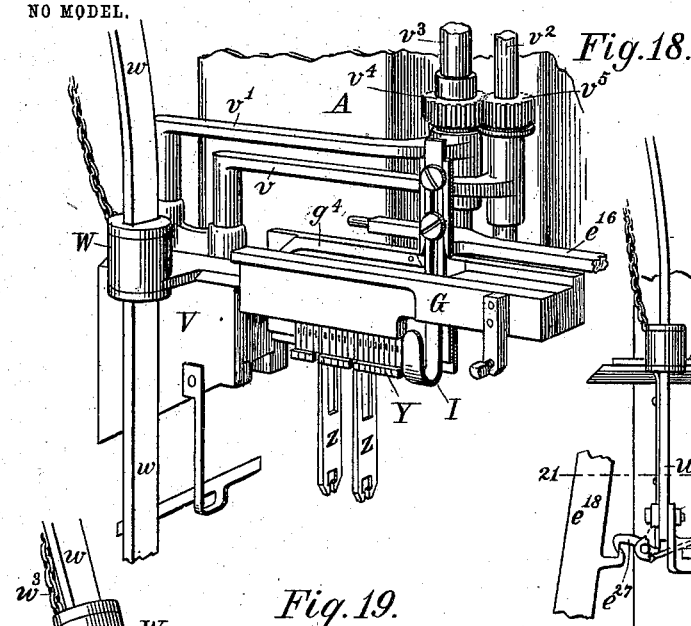
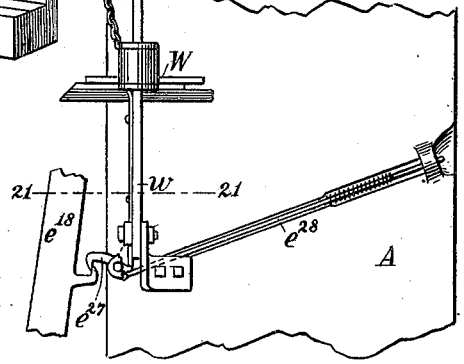
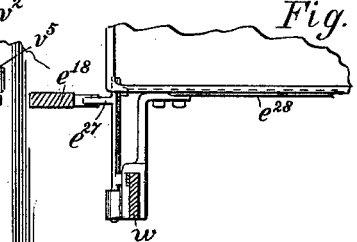
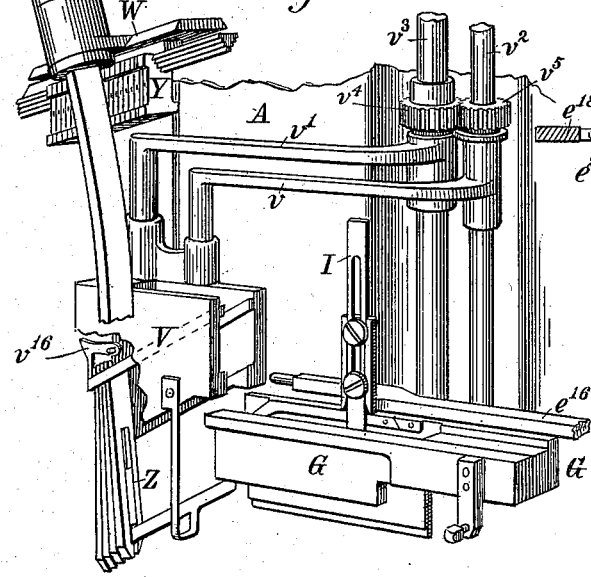
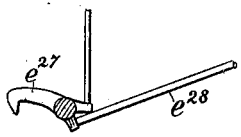
WITNESSES:
N. R. Kennedy
A. M. E. Kennedy
INVENTORS.
D. A. Poe
W. H. Scharf
BY Phil T. Dodge
ATTORNEY

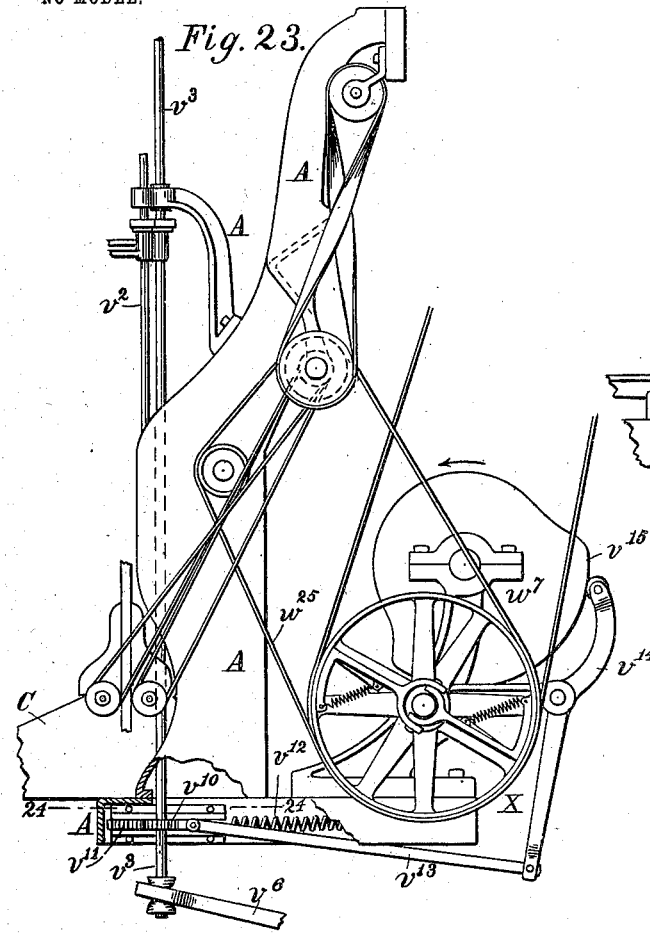
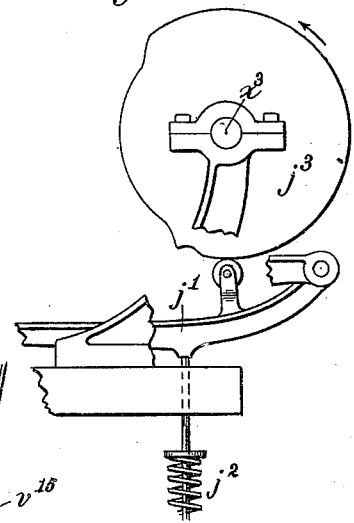
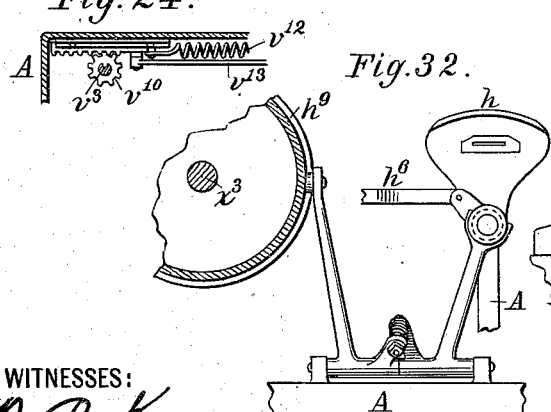
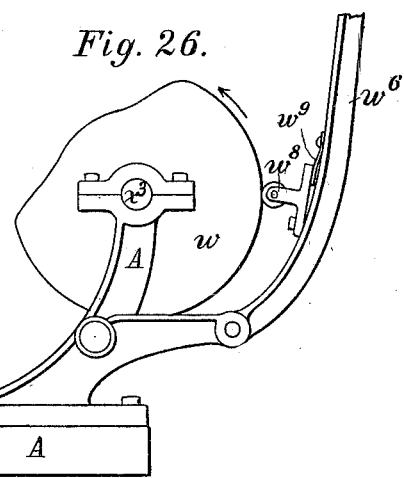

No. 734,746. PATENTED JULY 28, 1903.
D. A. POE & W. H. SCHARF.
LINOTYPE MACHINE.
APPLICATION FILED JAN. 15, 1903.
NO MODEL. 9 SHEETS—SHEET 9.
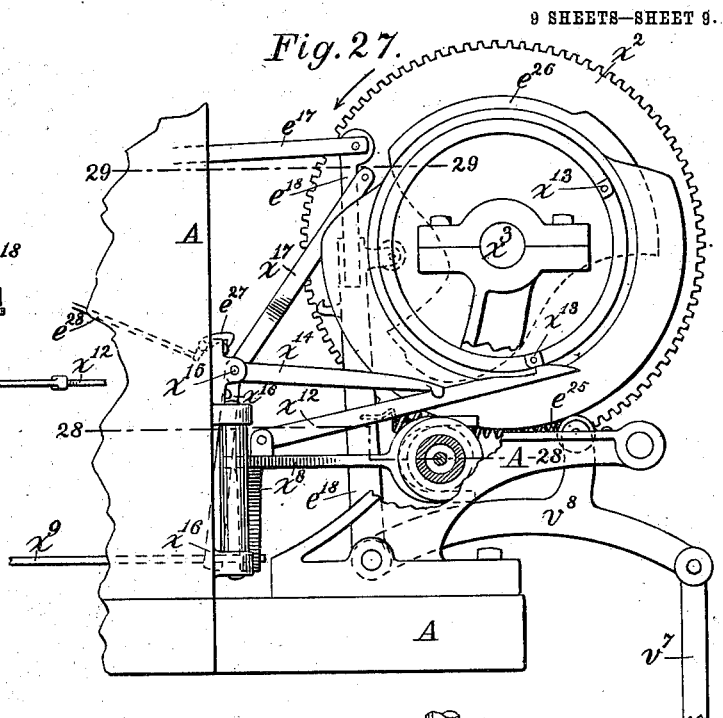
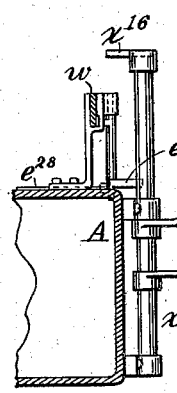
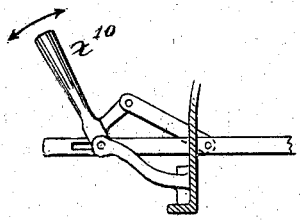
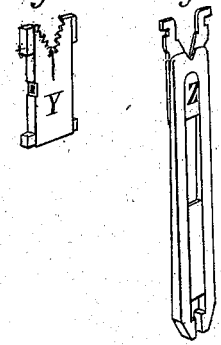
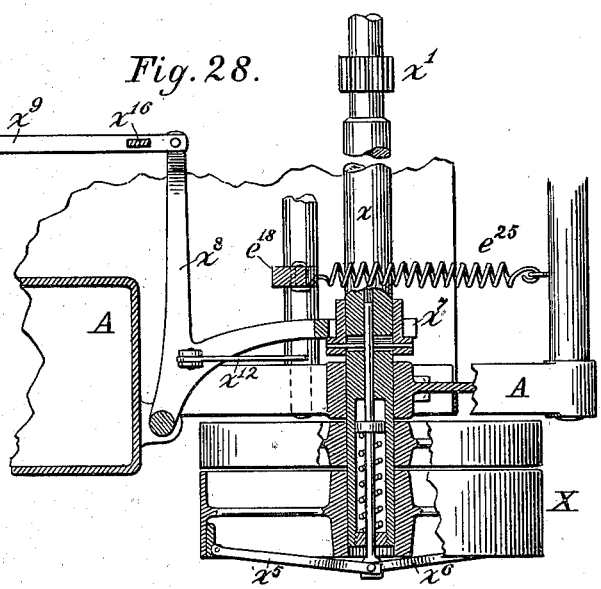
WITNESSES:
W. R. Kennedy
A. M. E. Kennedy
INVENTORS.
D. A. Poe
W. H. Scharf
BY P. T. Dodge
ATTORNEY No. 734,746. Patented July 28, 1903.

UNITED STATES PATENT OFFICE.

DAVID A. POE AND WILLIAM H. SCHARF, OF MONTREAL, CANADA, ASSIGNORS TO MERGENTHALER LINOTYPE COMPANY, A CORPORATION OF NEW YORK.

LINOTYPE-MACHINE.

SPECIFICATION forming part of Letters Patent No. 734,746, dated July 28, 1903.

Application filed January 15, 1903. Serial No. 139,244. (No model.)

*To all whom it may concern:*

Be it known that we, DAVID A. POE and WILLIAM H. SCHARF, of Montreal, Province of Quebec, and Dominion of Canada, have invented a new and useful Improvement in Linotype-Machines, of which the following is a specification.

This invention relates to a machine for producing and assembling linotypes or printing-bars, each bearing on the edge in relief properly spaced and justified the characters to print a line of predetermined length.

The machine embodies as a basis a series of circulating matrices each having a female character and distributing-teeth, and a series of circulating expansible spacers to be used with these matrices. Finger-keys in a keyboard represent the various characters and spacers and serve to release them in the required order. By suitable mechanisms the matrices and spacers are assembled in lines, the lines transferred successively to the face of a slotted mold and justified, the mold filled with molten metal to produce the linotype or slug with its edge formed in the matrices, and, finally, the matrices and spacers distributed to the upper end of the magazines from which they started, while the slugs are carried past trimming-knives and delivered successively into a galley.

In its general organization the machine resembles the well-known Mergenthaler linotype, described as to its essential features in United States Letters Patent Nos. 436,531 and 557,000.

In the Mergenthaler machine the matrices falling from the magazine were assembled in line and the composed line moved forward in the plane of assemblage to the casting mechanism and thereafter moved bodily upward and rearward to a distributing mechanism.

In the improved machine the casting, trimming, and ejecting mechanisms are arranged in a plane at right angles to the plane of assemblage or composition. Improved devices are provided for turning the matrix-line after its composition and transferring it to the casting mechanism, and in connection with these parts various novel features are provided in the casting mechanism and in the mechanisms for separating the matrices and spacers and transferring the former to their distributing mechanism and the latter to their magazine.

Figure 2:
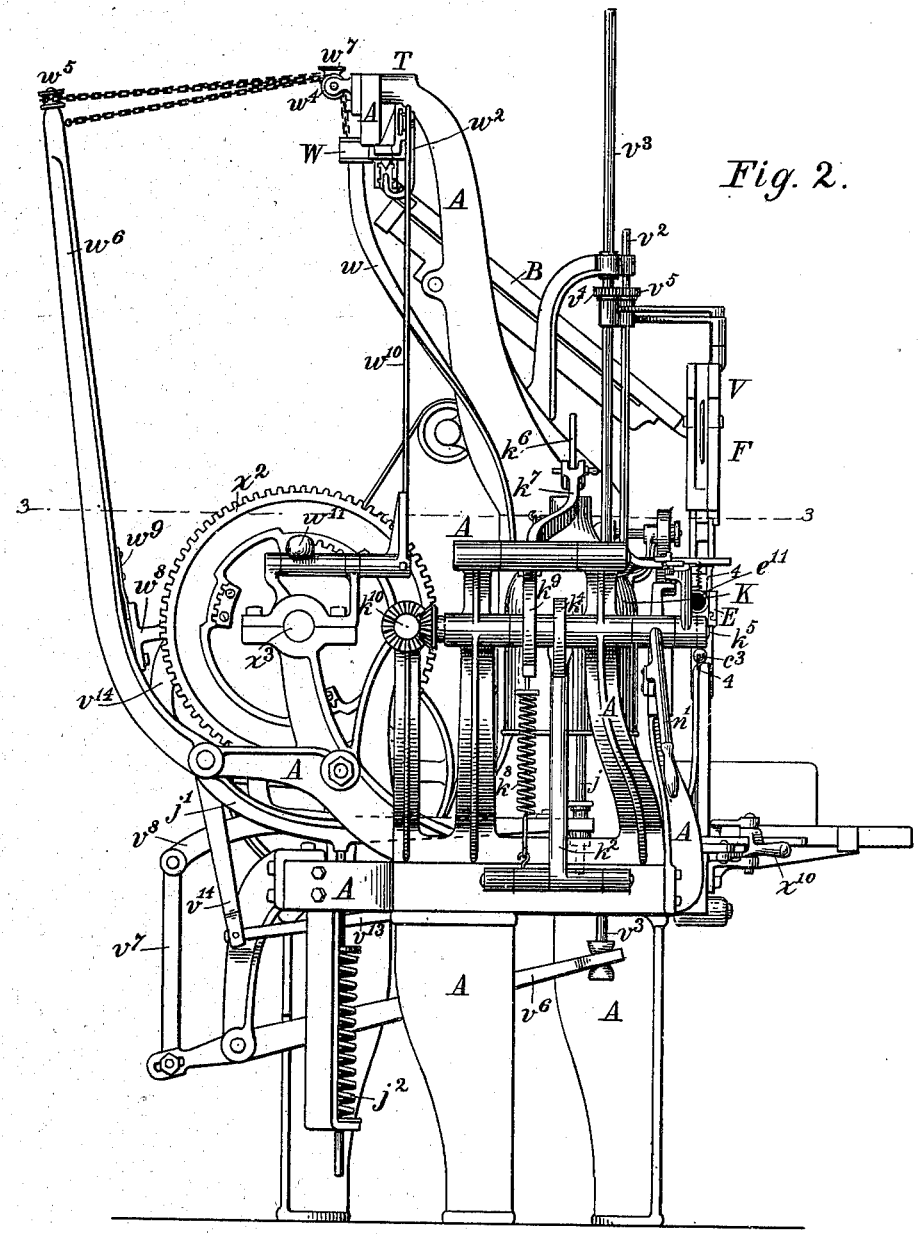
Figure 3:
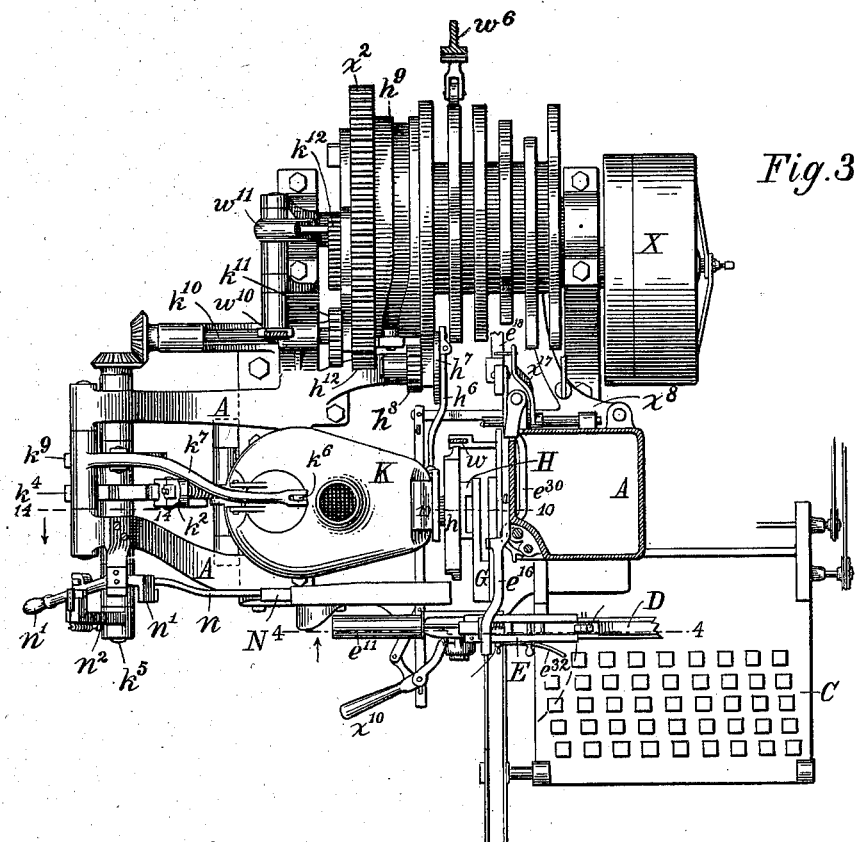
Figure 5:
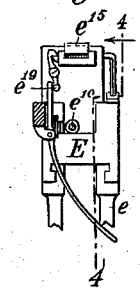
Figure 4:
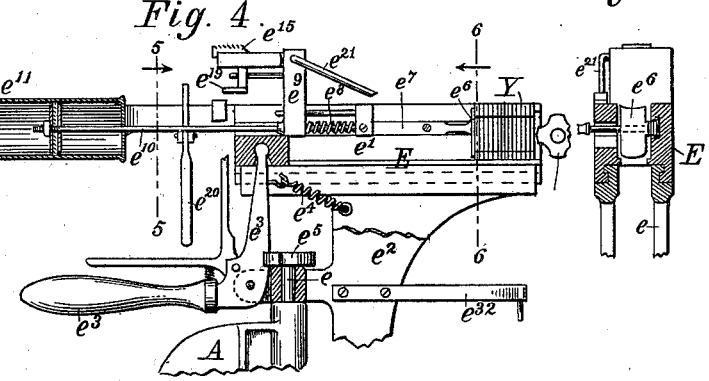
Figure 6:
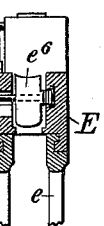

In the accompanying drawings, Figure 1 is a front elevation of the improved machine; Fig. 2, an end elevation of the same looking from the left. Fig. 3 is a horizontal section on the lines 3 3 of the preceding figures looking in a downward direction, the details of the keyboard, foreign to the present invention, being omitted. Fig. 4 is a longitudinal vertical section through the matrix-assembler and attendant parts on the correspondingly-numbered line of Figs. 2 and 3. Figs. 5 and 6 are vertical cross-sections of the same on the correspondingly-numbered lines of Fig. 4 looking in the direction indicated by the arrow. Fig. 7 is a top plan view of the matrix-assembler, casting devices, and adjacent parts with the assembler in the receiving or assembling position. Fig. 8 is a similar view with the assembler turned rearward at right angles to its original position and the transfer devices in the act of delivering the matrix-line to the casting mechanism. Fig. 9 is a perspective view of the assembler and adjacent parts in the position shown in Fig. 8, illustrating the manner in which the matrix-line is delivered to the supporting devices in front of the mold. Fig. 10 is a vertical cross-section through the casting devices with the matrix-line in position to coöperate therewith, the view being taken on the correspondingly-numbered line of Figs. 2, 3, 7, 8, and 9. Fig. 11 is a horizontal section through part of the casting mechanism on the correspondingly-numbered line of Fig. 10, showing particularly the manner in which the matrix-line is confined endwise when in the casting position. Fig. 12 is a front elevation of the mechanism for trimming the side faces of the slugs and delivering the same to the galley looking to the right on the line 13 13 of Fig. 1. Fig. 13 is a horizontal cross-section of the same on the correspondingly-numbered line of Fig. 12. Fig. 14 is a sectional elevation of the devices for operating the ejector-blade on the line 14, Fig. 3, looking in the direction indicated by the arrow. Fig. 15 is a sectional elevation illustrating the devices for assembling the slugs in the galley. Fig. 16 is a top plan view of the mold-carrier and adjacent parts, showing particularly the devices for holding in position the knife for trimming the base of the slug. Fig. 17 is a rear elevation of the mold, its carrier, the knife for trimming the base of the slug, and adjacent parts. Fig. 18 is a perspective view illustrating the parts for receiving the line of matrices and spacers subsequent to the casting operation, separating them, and transferring the matrices to their distributing mechanism and the spacers to their magazine, the parts being in the position occupied immediately after the casting operation. Fig. 19 is a similar view showing the same parts at a later stage in the operation, the matrices being lifted away from the spacers and the latter assembled in a temporary receiver or transfer device. Fig. 20 is a side elevation illustrating certain devices for controlling the parts shown in the two preceding figures and preventing their premature action. Fig. 21 is a horizontal cross-section on the correspondingly-numbered line of the preceding figure looking in a downward direction. Fig. 22 is a side elevation illustrating on a larger scale certain details shown in Fig. 20. Fig. 23 is an elevation looking toward the right-hand side of the machine and showing more particularly the main driving connections and the devices for imparting motion to the carriers for the matrices and spacers. Fig. 24 is a horizontal section on the correspondingly-numbered line of the preceding figure looking downward. Figs. 25 and 26 are side elevations illustrating two of the principal cams and the parts actuated by them. Fig. 27 is an elevation looking from the right and illustrating the driving and controlling mechanisms. Fig. 28 is a top plan view of the parts shown in the preceding figure, the main driving-shaft, its clutch, and attendant parts being shown in horizontal section through the center. Fig. 29 is a top plan view of certain of the parts shown in Fig. 27. Figs. 30 and 31 represent, respectively, a matrix and an expansible spacer.

As before mentioned, we employ as the basis of our machine a series of matrices and expansible wedge-spacers, which are shown in Figs. 30 and 31, their form and construction being preferably the same as those used in the Mergenthaler machines. Each matrix Y consists of a small plate of brass or like material of general rectangular form with a female character or matrix $y$ in one edge, with a series of distributing-teeth $y'$ in the upper end, and with projecting shoulders or lips on the opposite edges.

The expanding spacers Z consist of two oppositely-tapered wedges $z$ and $z'$, connected by a dovetail joint, the upper and shorter wedge $z$ being provided with ears, whereby the device as a whole is supported in the machine and the upper wedge held at rest in the line, while the lower and longer wedge is thrust upward through the line to elongate and justify the same, this action being the same as in the Mergenthaler machine.

Referring to Figs. 1, 2, and 3, A represents the rigid main frame, which may be of any form and construction adapted to sustain the various operative parts hereinafter described. B is a stationary inclined magazine consisting of top and bottom plates grooved in their proximate faces to receive the edges of the matrices which are stored therein, being received from the distributer at the upper end and delivered at the lower end in the manner usual in linotype-machines. C represents the keyboard, including a series of finger-keys representing the various characters, quads, and expansible spacers, these keys being connected through intermediate parts with the spacing devices in the mouth of the magazine B for the purpose of releasing therefrom the individual matrices in the order in which their characters are to appear in print. D is an inclined belt or apron upon which the released matrices fall from the mouth of the magazine and by which they are delivered in a downward direction one after another into the assembler E, by which they are assembled or composed in line. F is a fixed magazine in which expansible spacers are stored and from which they are delivered by gravity one at a time through the action of the finger-key that they may assume their places in the matrix-line in course of composition in the assembler E.

The two magazines, the keyboard, the conveyer-belt, and the assembling devices are all of essentially the same construction as in the ordinary Mergenthaler machine and form no part of our invention, for which reason a detailed description is deemed unnecessary herein. As to any features of these parts not shown or described herein reference may be had to the Mergenthaler patents above named and to the machines now in commercial use.

In the Mergenthaler machines the assembler E was arranged to rise after the completion of the line, so that the matrices which were received at one end moved out at the opposite end in the passage to the casting mechanism. Our assembler differs therefrom in that it is mounted on a vertical pivot $e$, so that after the composition of the line is completed it may be turned horizontally from the receiving position (shown in Figs. 1, 2, 3, and 7) to a position at right angles to that occupied while receiving the matrices, as shown in Figs. 8 and 9, its receiving end being carried rearward to communicate with the parts for presenting the matrices to the casting mechanism. The upper or channeled portion $e'$ of the assembler is mounted to slide endwise on the lower or supporting portion $e^2$, as plainly shown in Figs. 4, 5, 6, and 9, and this in order that the receiving end of the sliding portion may be interlocked with the frame and held in position during the entrance of the matrices and subsequently interlocked with the devices which are to receive the matrices. For the purpose of moving this sliding portion and of turning the receiver as a whole to and fro an angular hand-lever $e^3$ is pivoted to the lower portion, as shown particularly in Figs. 1, 4, and 9, its upper end being jointed to the sliding part and acted upon by a spring $e^4$, connecting it with the lower part. This spring tends to advance the sliding portion. The depression of the hand-lever effects its retraction. The lever locks into a fixed notch-plate $e^5$ to assist in holding the assembler from turning. When the composition of the line is completed, the operator compresses the end of the lever $e^3$, thereby drawing the top portion containing the matrices backward, disengaging its end from the frame, and at the same time disengaging the lever from the plate $e^5$, whereupon the assembler, being free, is turned by swinging the lever horizontally. When the assembler has been turned through an arc of ninety degrees, the lever is released, engaging another notch in the plate $e^5$ to lock the assembler in the new position and at the same time permitting the top portion to slide rearward until its end interlocks with the adjacent parts. The plate $e^5$ serves also the additional purpose of holding the lever and the sliding portion forward until the assembler has completed its rotation in one direction or the other.

During the assemblage of the matrix-line and as it elongates it is necessary to hold the matrices closely together in compact order. This is effected by a finger or resistance $e^6$ on the forward end of a slide $e^7$, mounted in a horizontal groove in the inner wall of the assembler and acting through an intermediate spring $e^8$ on a friction-slide $e^9$, so that a matrix-line advancing in the carrier will push the sliding parts rearward. After the carrier has been turned rearward these sliding parts are utilized to push the line of matrices out of the end of the carrier into the receiving and supporting members of the casting mechanism. In order to prevent this action from being too violent, we connect the sliding resistant to a piston-rod $e^{10}$, having its piston mounted to slide in a cylinder or dash-pot $e^{11}$, attached to the rear end of the assembler, as shown in Figs. 3, 4, 7, 8, 9, &c. As the matrices are delivered into the assembler they are retained therein, as shown in Fig. 7, by horizontal swinging pawls or dogs $e^{12}$, pivoted to the side walls of the assembler and forced inward by springs $e^{13}$, as shown in the supplemental figure adjacent to Fig. 7. For the purpose of opening these pawls to release the matrix-line when it is to be delivered sliding pins $e^{14}$ are mounted in the end of the assembler to act on the heels of the pawls, so that after the assembler has been turned to its rearward position and the top permitted to slide backward the pins $e^{14}$ contacting with the frame will open the dogs or pawls, so that the line may be pushed out of the assembler. When the matrix-line is thus delivered from the assembler, it requires to be supported in front of and against the mold while the latter is receiving molten metal from the pot at its back. The arrangement of parts to this end is clearly shown in Figs. 3, 7, 8, 9, 10, &c., in which G represents the line-support, consisting of two parallel arms rigidly connected at their forward ends and having their rear ends adapted to receive the line of matrices and spacers between them and to give support thereto by resting under their upper shoulders or ears, as shown in Figs. 10 and 18.

As before mentioned, the delivery of the matrices from the assembler into the support is effected by sliding the resistant $e^6$ and its connected parts rearward or toward the end of the assembler through which the matrices were introduced. This action is clearly shown in Fig. 9. In order to effect this delivering action of the slides, they are provided with a vertically-moving toothed dog or pawl $e^{15}$ to engage the toothed actuating-bar $e^{16}$, which is mounted to slide forward and backward in guides on the frame, as shown in Figs. 7, 8, and 9, under the influence of an actuating-link $e^{17}$, attached to the upper end of the vibrating lever $e^{18}$, actuated as hereinafter described. The actuating-arm $e^{16}$ stands normally in a forward position, as shown in Figs. 3 and 7, and when the assembler is turned to its rearward position the pawl $e^{15}$ is brought beneath the toothed end of the arm, as shown in Figs. 8 and 9. The pawl is held normally down by a latch $e^{19}$, Figs. 4 and 9. This latch $e^{19}$ is disengaged at the proper time by a finger-lever $e^{20}$, pivoted to the forward end of the assembler, as shown in Figs. 4, 5, and 9, and when thus disengaged it is thrown upward by an underlying spring into engagement with arm $e^{16}$, so that when the latter is moved forward by the actuating-lever it carries with it the slides in the assembler, causing them to push the matrix-line out of the assembler into the support G in front of the mold. As soon as this is accomplished the slides move forward in the assembler preparatory to its being restored again to the receiving position to receive the next line of matrices.

In order to disengage the slides from the actuating bar or slide $e^{16}$, the pawl $e^{15}$ is provided, as shown in Figs. 4 and 7, with a forwardly-extending arm $e^{21}$ and the assembler provided, as shown in Figs. 1, 7, 8, and 9, with a horizontal slide $e^{22}$, actuated by a finger-lever $e^{23}$ on the assembler and having at the rear end an inclined surface to act beneath the end of the arm $e^{21}$, and thereby rock the pawl or dog $e^{15}$ downward out of engagement with the arm $e^{16}$. This breaks the connection between the operating devices and the other parts, so that the assembler is free to turn forward.

During the delivery of the matrix-line rearward from the assembler into the support G it is necessary that the line shall be sustained at its rear end to keep it in compact form and prevent the matrices from falling out of position. For this purpose the actuating arm or slide $e^{16}$ is provided with a vertically-sliding finger I, the end of which hangs down normally in front of the matrix-line, which during its transfer is compressed and confined between the fingers I and the slide $e^6$, as shown in Fig. 9, the slide or detent being urged rearward by the spring at its front, as previously explained. When the slides return to the front after delivering the matrices, they carry with them the finger I, which must obviously be raised clear of the matrix-line to pass forward thereover. This is effected by means of a switch-bar $g^4$, lying along the inner wall of the support G, its forward end being mounted on a horizontal pivot $g^5$, while its rear end is beveled or inclined on the upper side. As the parts move rearward a stud on the finger I rides beneath and lifts the rear end of the switch $g^4$, which then falls, its inclined end standing in such position that when the slides move forward with the finger the stud on the latter will ride against the inclined surface of the switch and then travel along on its top, the effect being to raise the finger clear of the matrix-line and support it while it is traveling forward over the same. When the forward end of the switch is reached, the finger is permitted to drop again to serve as a support or resistant for the end of the next matrix-line as it is being transferred.

The line-support G, which is of ⊐ form in plan view, is carried on the upper end of a slide $g$, connected to the main frame by vertical slots and screws $g'$, as shown in Figs. 9 and 10, or by an equivalent sliding connection which will permit the support to move vertically to a limited extent under the influence of a lifting-spring $g^2$, and this for the purpose of alining the matrices against the mold, as will be presently explained.

The line-support G is so located that when the assembler containing the line is turned rearward the two will interlock and stand in exact alinement, so that when the line is pushed rearward out of the assembler E it will readily enter the support G and be sustained therein in front of the mold H, as shown in Fig. 10. This mold consists, as usual, of a block having therethrough from front to back a slot or mold proper of the exact dimensions of the required slug or linotype. It is mounted in a carrier plate or arm $h$, fixed on one end of a horizontal shaft $h'$, mounted so as to rock and also slide endwise in the main frame, so that the rocking of the shaft will serve, first, to place the mold horizontally in operative relation to the matrix-line, as shown in Fig. 10, and thereafter to carry the mold downward toward the front of the machine until the mold-slot assumes a vertical position to permit the ejection of the slug, as shown in Fig. 13, and hereinafter more fully explained. The mold is constructed with a horizontal shoulder $h^2$ along its front face to overlie the lips or shoulders at the lower end of the matrices, as shown in Fig. 10, so that when the line-support G rises, as previously mentioned, it will lift the shoulders of the matrices firmly against the shoulder of the mold, as shown in Fig. 10, and thus insure the horizontal alinement of their characters.

It will be understood that the mold-slot registers with the letters or characters in the matrices, so that when the mold is filled with molten metal to produce the slug or linotype this metal will flow into the matrices, which will produce the characters in relief on its edge, as usual.

It is necessary that the mold shall be pressed firmly against the edge of the matrices previous to the casting operation in order to form a close joint between them to prevent the escape of the molten metal, and it is further necessary after the casting operation to withdraw the mold from the matrices in order to draw the type characters on the edge of the slug out of the matrix-cavities and permit the matrix-line to be discharged endwise from the support G preparatory to distribution. This to-and-fro motion of the mold is effected by the end motion of its supporting-shaft $h'$, referred to above, this motion being effected by means hereinafter described.

It is of course necessary that the matrix-line while in front of the mold shall be confined endwise to maintain a close contact between the side faces of the matrices and spacers and to keep the line of exact length of the mold-slot. This is accomplished, as shown in Figs. 3, 7, 8, and 11, by lips or shoulders $h^3$, projecting from the front face of the mold, so that as the mold moves forward toward the line of matrices suspended in the support G the lips $h^3$ will pass outside of the ends of the line, which will consequently be confined between them, as plainly shown in Fig. 11. The inner faces of the lips $h^3$ are preferably beveled or rounded near their extremities, as indicated to facilitate the passage of the matrices between them.

After the line is confined, as above described, in front of the mold it is justified preparatory to the casting operation by thrusting upward through the line the long wedge-shaped members of such spacers Z as happen to be included in the line, as plainly shown in Figs. 9, 10, and 11, until the line is elongated or expanded tightly between confining lips. The upward movement of the spacers to effect justification and their downward movement after the casting operation to loosen the matrices are produced by the justifier-bar J, carried on the upper end of the rod $j$, mounted in guides on the main frame and actuated by a vertically-moving lever $j'$, as shown in Fig. 9, this lever being in turn operated as hereinafter explained.

The bar J has its upper edge of T form in cross-section, and the lower ends of the spacer-wedges contain corresponding notches, so that as the matrix-line containing the spaces is moved into the holder G the lower ends of the spacers embrace the upper edge of the bar J, as shown in Figs. 9 and 10. When the bar rises, it drives all the spaces upward. When it falls, it drives them positively downward to their original position in the line, leaving them free, however, to move laterally from the end of bar J when the matrix-line is transferred toward the distributing mechanism.

While the justified line is confined tightly against the mold the latter is filled with molten metal through its back from the perforated mouth of a melting-pot K, which is arranged to close tightly against the back of the mold, as usual, as plainly shown in Figs. 3, 7, 8, 10, 11, &c. The pot is provided with and supported by legs $k$, the lower ends of which are mounted on a horizontal shaft $k'$ in the main frame, this arrangement permitting the pot to swing forward and backward to and from the mold. The pot tends to fall back by gravity, and it receives its forward motion and a yielding pressure against the mold through a lever $k^2$, (see Fig. 1,) pivoted at its lower end to the main frame and acting at its upper end on a spring $k^3$, mounted on an eyebolt loosely connecting the pot and lever. The lever carries an antifriction-roller which receives motion from a cam $k^4$ on a horizontal shaft $k^5$, mounted in the main frame. It will be observed that this shaft, the delivery-mouth of the pot, the mold, and the line-support all lie in parallel lines at right angles to the front of the machine and to the plane in which the matrix-line is composed. The delivery of the molten metal from the pot to the mold is effected, as usual, by a vertical plunger $k^6$, acting in a well or cylinder in the pot, as in the Mergenthaler machine. This plunger is actuated by a lever $k^7$, depressed by a spring $k^8$, Fig. 1, and raised and maintained at the proper times by a cam $k^9$ on the shaft $k^5$ acting against an antifriction-roller on the under side of the lever. After the casting operation the mold is withdrawn from the matrices, as previously described, and then swings downward and forward in the manner indicated in Fig. 16 through an arc of ninety degrees until its slot containing the linotype-slug L stands in a vertical position preparatory to delivery, the means for imparting this motion to the mold being hereinafter described. When the mold reaches the vertical position, it stands, as shown in Fig. 13, directly in front of two vertical trimming-knives M and M', adjustably secured to the main frame in such position that the outgoing slug will be delivered between them and trimmed on its side faces to make it of exact and uniform thickness and to remove the thin burs or fins which are sometimes produced at the forward edge by the metal overflowing between the matrices and the mold when the parts are not absolutely clean. The delivery of the slug is effected by an ejector-blade N, mounted to slide horizontally in guides in the main frame, as shown in Figs. 1, 3, 13, and 16, and having travel sufficient to deliver the slug from the mold and between the knives into the stationary chute or guide O beyond them. After the slug has passed the knives it is free to fall endwise into the chute, which is formed with a shoulder or offset $o$ of such form as to receive and arrest the lower end of the falling slug and give the upper end an outward or falling tendency, as indicated by the arrow in Fig. 12, so that the slug turns over end for end and slides out of the lower end of the chute into the stationary receiving-galley P, into which the slugs fall one after another on end, this assembled series or form of slugs being pushed forward in the galley against a sliding support Q by the vibrating pusher R, as shown in Figs. 12 and 13.

While the slug remains in its original position in the mold its base is trimmed flush with the rear face of the mold in order that it may be of exactly the predetermined height, usually type high. This is effected, as shown more particularly in Figs. 15 and 16, by a stationary knife S, adjustably bolted to an arm on the main frame in such position that as the mold is carried to the ejecting position its rear face is carried closely against the edge of the knife.

It is important that the knife shall be held closely or snugly against the face of the mold during this trimming action, so that there may be no variation in the height of the slug in consequence of the springing of the mold-support or the knife-support. The arm which supports the knife is therefore extended outward and forward past the edge of the mold-supporting arm $s$ and provided at the front with an antifriction-roller $m$ to ride against the front face of the arm, which is parallel with the rear face. By this arrangement the arm is held forward firmly, so that its knife will bear closely against the mold. While it is preferred to use the roller $m$, it is evident that it simply serves to reduce the friction and that the knife-arm may bear directly on the face of the mold-carrying arm.

After the line of matrices and spacers has served its purpose at the front of the mold it is necessary to transfer the matrix-line to the distributing mechanism at the top of the machine and to separate the spacers from the line and transfer them directly to their magazine F. The distributing mechanism is the same as that of the ordinary Mergenthaler machine, consisting of a horizontal bar T, overlying the magazine and provided along its lower edge with permuted teeth to engage the teeth in the upper ends of the matrices and sustain them as they are carried along the bar by horizontal feed-screws U until they arrive over their proper channels in the magazine.

The magazine F for the space-bars is also of the usual form, the spacers being introduced at its upper side and sustained by their ears on its side plates or cheeks, descending by gravity to the front, where they are released one at a time.

As the distributer and the spacer-magazine both lie parallel with the front of the machine, while the composed line stands at right angles thereto during the casting action, it is necessary that both the matrices and the spacers shall be given a quarter of a revolution before presentation to the distributer and to the spacer-magazine, respectively. For this purpose I employ the mechanism represented in detail in Figs. 1, 2, 18, and 19, in which V represents a carrier for the spacers having inclined shoulders on its inner faces to receive the supporting-lips of the spacers. This carrier, open at the top, is mounted so that it first descends into position at the rear end of the matrix-line support G, as shown in Fig. 18, so that when the matrix-line containing the spacers is pushed rearward out of the support the spacers will be received in the carrier V, which thereafter rises and turns horizontally, finally coming into position against the upper side of the space-magazine F, as shown in Fig. 1, so that when the spacers are released, as presently explained, they will slide out of the carrier V into the magazine F.

For the purpose of lifting and turning the matrix-line the elevator W is provided, consisting of a bar toothed on its under side to engage the teeth of all the matrices as the line is pushed rearward out of the support G. This elevator W has a supporting-arm mounted to slide on a fixed guiding-bar $w$, fixed to the main frame and twisted, as shown in the various figures, so that when the elevator descends it is guided to a position in the top of the spacer-carrier V, as shown in Fig. 18, and that when lifted it will be given a quarter-revolution and be brought into alinement with the distributing devices at the top of the magazine, so that the matrix-line may be pushed forward endwise from the elevator into the distributing mechanism by the horizontal slide $w^2$, as in the linotype-machine.

The elevator W descends by gravity and is raised at the required time by a lifting-chain $w^3$, passed, as shown in Fig. 2, over a fixed guide-pulley $w^4$, thence around a pulley $w^5$ on the end of the vibrating arm $w^6$, forward around another fixed pulley $w^7$, and finally back again to the arm $w^6$, this arrangement multiplying motion, so that a comparatively small movement of the arm is sufficient to cause the chain to lift the elevator snugly to its uppermost position adjacent to the distributing devices. The arm $w^6$ is pivoted at its lower end to the main frame and provided near the lower end with a roller $w^8$, riding against an actuating-cam $w^7$, as shown in Figs. 2 and 26. This roller is carried by a plate jointed to the arm $w^6$ and acting on an intervening spring $w^9$. This connection permits the application of a yielding strain to the lifting-chain, so that the elevator is drawn up with certainty to its seat at the end of the distributer, insuring exact alinement. Referring again to the spacer-carrier V, it receives its vertical and rotary motion through devices shown particularly in Figs. 1, 18, 19, and 23. It is carried by wrists on the rear ends of two horizontal crank-arms $v$ and $v'$, carried, respectively, by a vertical guide-rod $v^2$ and a vertical shaft $v^3$, which latter is mounted to rotate and also to slide up and down through guides in the frame. The crank $v'$ is fastened to the shaft $v^3$ to move therewith, and the crank $v$ is connected therewith through a collar and groove, so that the two are compelled to rise and fall together, although permitted to turn horizontally about their different centers. The two cranks are connected by pinions $v^4$ and $v^5$, so that when the crank $v'$ is turned in one direction by the rotation of its shaft $v^3$ the pinions will turn the crank $v$ in the opposite direction around the guide-rod $v^2$. The cranks lie in different horizontal planes, and moving, as they do, about different centers and being pivoted, as they are, to the carrier V at different points they serve not only to carry it bodily forward and backward, but also to give it an independent horizontal rotation, so that if the arms were raised from the position shown in Fig. 18, taking with them the carrier V, and then turned forward they will swing the carrier V around in position to connect, as shown in Figs. 1 and 2, with the receiving side of the spacer-magazine F.

The necessary longitudinal and rotary motions are imparted to the shaft $v^3$, as shown more particularly in Figs. 23 and 24. A grooved collar on the lower end of the shaft is embraced by the end of a vertically-moving lever $v^6$, pivoted to the main frame, as shown in Fig. 2, and receiving motion at its rear end through link $v^7$ from a lever $v^8$, also pivoted to the main frame and acted upon by cam $v^9$, as shown in Fig. 27. The rotary motion is imparted by a pinion $v^{10}$, fixed on the lower end of the shaft $v^3$ and actuated by a horizontal rack $v^{11}$, guided in the main frame and receiving motion in one direction from a spring $v^{12}$ and in the opposite direction from a link $v^{13}$, actuated by an upright lever $v^{14}$, pivoted to the frame and acted upon by a cam $v^{15}$.

To retain the spacers in the carrier V, it is provided at the lower end, as shown in Fig. 19, with vertically-movable dogs or pawls $v^{16}$. When the carrier is brought into position against the magazine F, these pawls are automatically thrown out of action, so that the spacers slide forward by gravity out of the carrier V into the magazine.

The delivery of the line of matrices and spacers from the rear end of the support G to the carrier V and elevator W is effected by a rearward movement of the finger I, as indicated in Fig. 18. It will be remembered that this finger stands in front of the line as the latter is shifted from the assembler into the support G, as shown in Fig. 9, and that it is subsequently lifted, carried forward, and permitted to drop behind the line in front of the next or second incoming line. It will be observed, therefore, that the finger serves the double purpose of holding the incoming line in compact order and of thereafter pushing the line out of the support G. As the line is transferred into the spacer-carrier V the elevator W rests on top of the carrier, so that the one movement delivers the spacers into the carrier and the matrices into engagement with the bar of the elevator. The elevator then rises, as shown in Fig. 19, lifting all the matrices away from the spacers, which remain suspended in the carrier V. The elevator continues its course to the distributing mechanism, while the carrier rises and turns forward in position to deliver the spacers from the carrier into their magazine.

The actuating-bar $e^{16}$, through which the matrix-line is shifted, receives motion, it will be remembered, through link $e^{17}$ from lever $e^{18}$. This lever is pivoted at its lower end to the main frame and urged constantly rearward by a spring $e^{25}$ in opposition to the action of a cam $e^{26}$. The cam serves to drive the bar $e^{16}$ forward, while the spring serves to pull it rearward when released that it may through the intermediate parts shove the matrix-line rearward.

The machine receives motion primarily through a loose driving-pulley X, connected by a clutch with a horizontal driving-pulley $x$, mounted in the main frame and carrying a pinion $x'$, engaging a large gear-wheel $x^2$ on the horizontal main shaft $x^3$. The clutch is of the ordinary Mergenthaler type, consisting of shoes bearing on the inside of the driving-pulley under the control of toggle-levers $x^5$, which are in turn actuated by an axle-rod $x^4$, sliding in the main shaft. An internal spring $x^6$ tends to spread the clutch and start the machine, while a collar $x^7$, connected with the forked end of a controlling-lever $x^8$, serves to move the rod endwise against the spring, and thus contract the clutch that the machine may stop. The clutch-lever $x^8$ is connected with a bar $x^9$, extending to the front of the machine, operated through a link on the hand-lever $x^{10}$, pivoted to the frame. When the lever is thrown rearward, the clutch is opened and the machine stops. To the lever $x^8$ there is pivoted a rising-and-falling latch $x^{12}$, (see Figs. 27 and 28,) having a hooked end which is engaged by shoulders $x^{13}$ on one of the revolving cams of the main shaft, so that when the machine is in motion and has reached the proper point the shoulder $x^{13}$, engaging the latch, will pull it endwise and cause it to operate lever $x^8$ and throw out and hold out the clutch, bringing the main shaft and the various cams thereon to a rest.

When the machine is to be started, the clutch-holding latch $x^{12}$ is dropped out of engagement with the shoulder, so as to release the clutch-lever $x^8$. This is done by an arm $x^{14}$, (see Figs. 27 and 29,) mounted on a horizontal shaft $x^{15}$, provided with an arm $x^{16}$, which engages the controlling-bar $x^9$, before referred to, so that when this bar is drawn forward the arm $x^{14}$ throws the latch $x^{12}$ out of engagement, permitting the spring to throw the clutch into action. The shaft $x^{15}$ is also provided with an upright arm $x^{17}$, having on its end a stud or pin which rests behind the lever $e^{18}$, through which, it will be remembered, the line-shifting devices are actuated. When the lever $e^{18}$ is thrown forward by its actuating-cam, it is caught and held forward, as shown in Fig. 20, by a pivoted latch $e^{27}$ on the main frame, and while it is thus held against the effort of its retracting-spring the surface of the actuating-cam retreats therefrom. The latch $e^{27}$ is connected with a sliding rod $e^{28}$, extending to the front of the frame in a position to be acted upon by the rear end of the assembler as it slides backward to connect with the line-support. After the line-support has been rotated to carry the line rearward its operating-lever $e^3$ is raised and the rear end of the assembler pushed against the starting-rod $e^{28}$, the effect being to disengage the latch $e^{27}$ and permit the lever $e^{18}$ to swing rearward, so that through the intermediate parts it will carry the arm $e^{16}$ and the matrix-shifting devices rearward, carrying the line into the support G.

The shifting devices must not be permitted to carry the line beyond the casting-point in the first movement. A horizontal stop-lever $e^{30}$, Figs. 7, 8, and 18, is therefore pivoted in the frame and provided with a shoulder to serve, as shown in Fig. 8, as a stop for the transfer-bar $e^{16}$ when it shoves the matrix-line into the carrier. The forward end of this stop-lever $e^{30}$ is notched, as shown at $e^{31}$, to interlock with the end of an arm $e^{32}$ in the turning assembler E.

When the assembler is turned rearward, its arm sets the stop in operative position, as shown in Fig. 8, so that when the top of the assembler is moved rearward by the hand-lever to disengage the dog $e^{27}$ and release the actuating-lever $e^{18}$ the latter is permitted to pull the bar $e^{16}$ rearward only to the point at which it is arrested by the stop $e^{30}$. When, however, the receiver is turned forward toward its receiving position, the stop $e^{30}$ is drawn back out of the path of the shifter-bar $e^{16}$, so that the latter may move farther to the rear when the controlling-cam permits the further movement of lever $e^{18}$. This cam $e^{26}$, already referred to and shown in Fig. 27, is of such form as to give two forward and backward movements to the parts during each revolution, the first movement to shove the matrix-line rearward from the assembler to the casting position, the second to cause the finger I, which has in the meantime been lifted over and dropped in front of the matrix-line, as already explained, to shove the line out of the support into the elevator and spacer-carrier.

It will be remembered that the wedge-spacers are pushed upward through the line to effect justification by the guide-rod J, Fig. 9. This rod receives its vertical movements from the forked end of the horizontal lever $j'$, fitting over and under a collar on the rod. The lever $j'$ is pivoted at one end to the main frame, as shown particularly in Fig. 25, and urged upward by a spring $j^2$, acting through a rod thereon, so that the spacers are pushed upward with a yielding or spring pressure. The rise of the lever known as the "justification-lever," is controlled by a cam $j^3$ on the main shaft, this cam being so formed that it causes the spring-actuated lever and the bar J, which has a slight vertical play in relation to the spacers, to drive them through the line by repeated strokes and after the casting operation to draw them downward positively.

The ejector-slide N for driving the slugs out of the mold is actuated, as shown in Figs. 1, 2, 3, and 14, by a connecting-rod $n$, jointed at the lower end of a lever $n'$, mounted loosely on the end of the horizontal shaft $k^5$. This shaft carries a revolving arm $n^2$, the outer end of which engages a sliding pin $n^3$ in the outer angular end of the ejecting-lever $n'$. This establishes a momentary connection between the revolving arm and the lever, imparting motion to the latter and thence to the ejector-blade to drive it forward. As the ejector-blade reaches its limit of movement the coupling-pin $n^3$ encounters an inclined surface $n^4$ on the main frame and riding thereover is withdrawn sufficiently to release the ejector-lever, the forward motion of which ceases, while the crank continues to revolve. A returning-spring $n^5$ is extended from the lever to the frame, and as soon as the lever is released this spring throws it backward and retracts the ejector-blade. The lower end of the lever is preferably fashioned into a handpiece in order that the attendant may operate the ejector by hand, if required, for the ejection of slugs which offer excessive resistance.

It will be observed that the shaft $k^5$, carrying the ejector-lever, the pot-operating cam, and the pump-operating cam, lies at right angles to the main shaft $x^3$, which carries all the other actuating-cams. The shaft $k^5$ receives motion through miter-gear from a second horizontal shaft $k^{10}$, Fig. 3, carrying a pinion $k^{11}$, which receives motion from a sector-rack $k^{12}$ on the side of the main gear-wheel $x^2$. This pinion also has a square hub coöperating with delay-surfaces on the gear-wheel after the manner of the well-known stop-motion gear used in the linotype-machine. This arrangement imparts an intermitting rotation to the pot and pump cams.

The mold-carrying arm receives its vibratory movement and the proper dwell at the casting and ejecting positions by the arrangement shown in Figs. 3, 17, and 32, the disk-carrying shaft $h'$ being provided with a crank $h^5$, connected by pitman $h^6$ to a crank-wheel $h^7$, carried by the shaft of a pinion $h^8$, which receives an intermitting rotation through a rack on the cam-wheel $h^9$ on the main shaft. The pinion $h^8$ is provided with a square hub or delay-surface corresponding with the peripheral surface of the cam, whereby the pinion is stopped and held at rest at the finish of each half-revolution. Thus it is that the disk is carried to and fro and held at rest first in front of the mold and then in front of the ejector. The forward-and-backward movement of the mold is effected by sliding its shaft-axle in its bearings. This movement is secured by the peripherally-grooved cam $h^9$, above referred to, acting on the arm of the rocking frame $h^{12}$, which is pivoted, as shown in Fig. 32, to the main frame and provided with a forked arm embracing a collar in the mold-arm shaft $h'$. It will be observed that this rocking frame is divided and the two parts connected through the intermediate spring, so that although the cam imparts a positive forward motion to the frame the latter applies a yielding or spring pressure to urge the mold forward against the edge of the matrices.

It will be remembered that the distributing mechanism receives the matrix-line from the elevator W through the action of the pressure-slide $w^2$, Fig. 1. This slide is actuated, as in the Mergenthaler machine, through a link from an upright lever $w^{10}$, having its lower end attached to a hub mounted on a horizontal pivot on the main frame, as shown in Fig. 3, this hub having a second arm $w^{11}$, (see Fig. 2,) acted upon by a cam-surface on the side of the main gear-wheel $x^2$.

The feed-screws of the distributing mechanism and the customary driving-rolls of the keyboard mechanism and the assembling devices are driven constantly, as is usual in this class of machines, while the casting, ejecting, and transferring devices are operated intermittingly.

The arrangement of belts for imparting motion to the continuously-moving parts is plainly shown in Fig. 23. It will be observed that they all receive motion through a primary belt $w^{25}$ from the constantly-turning main pulley.

In order to adapt the machine for setting lines of different lengths, it is only necessary to adjust the screw $e^{40}$ in the end of the bar $e^{16}$ to control the advance of the bar and the distance to which the forward end of the line will be advanced in the support G. The opposite end or front end of the line is taken care of automatically, since the series of teeth on the bar $e^{16}$ and the latch $e^{15}$ will permit them to engage in different positions.

Of course the length of the mold-slot will be varied to correspond either by substituting molds or by adjusting the liners in the ends of the mold, as commonly practiced in this class of machines.

The parts being in the position shown in Figs. 1, 2, 3, and 7, the operator manipulates the keys representing the required characters and spacers in the proper order. The matrices are delivered from the magazine B and assembled in line in the assembler E, together with the spacers released from the magazine F. The matrices and spacers are crowded successively into the line, as usual, by the revolving star-wheel opposite the assembler, as shown in Fig. 7. The advancing line is resisted and held in compact order by the slide $e^6$. When the line is of such length that the introduction of an additional word or syllable is impossible, the composing operation ceases. The operator, grasping the handle $e^3$, depresses the same to draw back the upper part of the assembler and unlock it from the frame, after which, retaining his hold on the handle, he swings the assembler rearward to the position shown in Fig. 8 into alinement with the line-support G and underneath the bar $e^{16}$. He then operates the lever $e^{20}$, thereby disengaging the dog $e^{19}$ from the latch $e^{15}$, which springs upward into engagement with the teeth of the bar $e^{15}$. He then lifts the handle $e^{23}$, sliding the top of the assembler backward against the rod $e^{28}$, Fig. 20, and thereby releases the lever $e^{18}$, which is drawn backward by spring $e^{25}$, carrying with it the bar $e^{16}$, which, as shown in Fig. 9, pushes the matrix-line out of the assembler E into the support G, the bar $e^{16}$ being arrested by the stop $e^{20}$, Figs. 8 and 9. The finger-lever $e^{23}$ is then actuated to move the slide $e^{22}$, Figs. 7, 8, and 9, causing the forward end to trip the pawl $e^{15}$ of the assembler-slide out of engagement with the bar $e^{16}$. The assembler is now turned forward to its original position, carrying the resisting slide $e^6$ with it away from the front end of the matrix-line. During this restoration of the assembler to its receiving position its arm $e^{22}$ thrusts back the stop $e^{30}$, permitting the bar $e^{16}$ to continue its rearward movement under the influence of lever $e^{18}$ to carry the finger I away from the rear end of the matrix-line, leaving the line supported in front of the mold. The mold closes toward the line, which is embraced between the mold-lips $h^3$. The support G is slightly raised to aline the matrices by setting their ears upward against the under edge of the mold. The bar J rises and pushes the spacers Z through the matrix-line to effect its elongation and justification. The mouth of the pot K closes against the back of the mold. The pump delivers molten metal through the mouth of the pot into the mold H and against the matrices, thus forming the linotype L. The pot and mold retreat, and the mold-carrying arm swings down to the right, carrying the base of the slug past the stationary knife S and presenting it in front of the ejector N, by which it is pushed forward out of the mold between the trimming-knives M M', Figs. 12 and 13, into the chute O, through which it falls with a turning motion into the galley P. The bar $e^{16}$, having moved rearward until the stud on the finger I is beyond the rear end of the switch $g^4$, reverses its movement and moves forward, carrying the finger I over the top of the matrix-line and permitting it to fall in front of the same, as shown in Fig. 18. The bar $e^{16}$, moving forward again, causes the finger I to push the line of matrices and spacers rearward out of the support G, the matrices engaging the elevator W, while the spacers lodge in the carrier V. The elevator lifts the line of matrices, as shown in Figs. 1 and 19, to the distributing mechanism, through which the matrices are returned to the top of the magazine. In the meantime the carrier V rises, revolves, and seats itself against the spacer-magazine F, into which it delivers the spacers.

All the operations necessary to the production of a linotype are performed at each revolution of the main shaft, and when the cycle of operations is complete this shaft and the connected parts are brought automatically to rest, while the assembling and distributing devices continue their action.

The expressions "line," "matrix-line," and "line of matrices" as herein used are synonymous and unless otherwise specified are intended to designate the composed line of matrices, including the spacers.

The words "assembling" and "composing" as used herein are synonymous, and the expressions "assembled lines" and "composed lines" are also synonymous.

The expression "assembling mechanism" as herein employed is intended to include the parts necessary for delivering the matrices and spacers successively to a common line in the assembler or equivalent support for maintaining them in line.

We believe ourselves to be the first to combine with an assembling mechanism and a casting mechanism arranged at right angles to each other an intermediate assembler or line-support having an oscillating or vibratory motion in order to receive the line in one direction from the assembling mechanism and deliver it in a different direction to the casting mechanism; also, the first to provide means for turning a composed matrix-line horizontally for presentation to the casting mechanism and thereafter turning it so that it faces in the original position for presentation to the distributing mechanism.

It will be observed that by the employment of a line-support having a vibratory as distinguished from a rotary motion we are enabled to produce a simple and compact machine and one in which the first line may be delivered to the casting mechanism and the carrier returned to the receiving position without waiting for the completion of the casting operation.

What is claimed as the invention is—

1. In a linotype-machine, a matrix-line assembler arranged to turn to and fro about a vertical axis, whereby it is adapted to receive the matrices in one direction and to deliver them in a different direction.

2. In a linotype-machine, mechanism for assembling the matrix-line in one plane, mechanism for casting the slug in a plane in angular relation to the first, and intermediate oscillating means for turning the line from one plane to the other.

3. In a linotype-machine, the combination of a horizontal oscillating assembler, means for delivering the line of matrices to the assembler in one of its positions, means for receiving the line of matrices from the assembler when the latter is in a second position and supporting it, and means for effecting the discharge of the line in said support.

4. In a linotype-machine, in combination with means for delivering the matrices successively thereto, an assembler E mounted to vibrate about a vertical axis, a line-support G arranged to receive the matrices from the assembler when the latter is turned at an angle to its receiving position, and a slide mounted in the assembler for the double purpose of resisting the matrices during the composition of the line and of discharging the composed line to the support.

5. In a linotype-machine and in combination with means for delivering the matrices successively thereto, an assembler mounted to turn about a horizontal axis and provided with a longitudinally-sliding upper portion, to interlock with the frame, whereby alinement of the parts is maintained during the composition of the line.

6. In a linotype-machine and in combination with a line-support G, a horizontally-turning assembler E, having its upper portion arranged to slide endwise, whereby it is adapted to interlock with the line-support.

7. In a linotype-machine, means for delivering the matrices in one vertical plane to the line, means for casting from the composed line in a plane at right angles to the first, means for turning the assembled line from the first plane to the second, and means for transferring the line, when turned, to the casting mechanism.

8. In a linotype-machine, an assembler mounted to turn on an axis from a receiving to a delivering position, means for delivering the matrices into the assembler from one end, and means for delivering the composed line from the assembler at the end through which it entered.

9. In a linotype-machine, an assembler having an open end, substantially as described, to permit the introduction of the matrices in the direction of the length of the line, and the removal of the composed line in a reverse direction through the open end, said assembler mounted to turn on an axis at right angles to the length of the line, substantially as and for the purpose specified.

10. In a linotype-machine, in combination with mechanism for delivering the matrices successively thereto and mechanism for receiving the composed line therefrom, the intermediate pivoted assembler E, a slide therein to effect the discharge of the composed line after the assembler is turned, and power-driven mechanism for actuating said slide.

11. In a linotype-machine, the combination of an assembler E, pivoted to turn from a receiving to a discharging position, a discharging-slide therein, means for supporting the matrix-line when discharged, a reciprocating power-driven bar $e^{16}$, and means for connecting said bar to the discharging-slide, whereby the delivery of the line from the assembler to the support is effected.

12. In a linotype-machine, the vibrating assembler E, having a sliding upper portion to carry the matrices, in combination with the connecting and operating lever $e^3$.

13. In combination with the pivoted vibrating assembler E, the lever $e^3$ and a coöperating member $e^5$, whereby the assembler is locked in position.

14. In combination with the assembler E, the slide therein, the power-driven bar $e^{16}$, and the pawl on the assembler-slide to engage said bar.

15. In combination with the assembler, the slide therein, its pawl $e^{15}$, and the actuating-bar $e^{16}$ arranged to engage the pawl in different positions, whereby compensation is made for variation in the length of the matrix-line.

16. In combination with the assembler, the support G arranged to receive the matrix-line therefrom, devices to effect the transfer of the line, and a movable stop $e^{20}$ to arrest the advance of the transfer devices.

17. In combination with the turning assembler E, the support G to receive the matrix-line from the assembler, means for effecting the transfer of the line, and a stop $e^{20}$, controlled in its position by the assembler, whereby the accidental transfer of the line beyond the casting-point is prevented.

18. In a linotype-machine and in combination with the assembler, a support G to receive the matrix-line therefrom, a spring-actuated mechanism to effect the transfer of the line, and a locking device for said mechanism, controlled by the assembler, whereby the action of the transfer devices is prevented until the assembler is adjusted in proper relation to the line-support.

19. In a linotype-machine and in combination with the assembler E, a support G to receive the composed line of matrices therefrom, a spring-actuated lever $e^{18}$ and devices connected therewith to effect the transfer of the line from the assembler to the support, a locking device $e^{27}$ to prevent the movement of said lever, and a connection $e^{28}$, whereby the assembler is enabled to release the lever and transfer devices.

20. The turning assembler E and the slide therein to expel the matrix-line, in combination with the actuating-bar $e^{16}$, the pawl for connecting the slide with said bar, and a manual device, as $e^{22}$, for disengaging the pawl.

21. In a linotype-machine, in combination with an assembler to which the matrices are successively delivered, a slide serving the double purpose of resisting the incoming matrices and of expelling the composed line.

22. In a linotype-machine, the combination of an assembler E, a slide therein to expel the composed line, a power-driven actuating-bar $e^{16}$, a pawl $e^{15}$ to connect the slide with said bar, a latch to hold the pawl out of engagement, and a manual device for disengaging the pawl, whereby connection is established between the slide and the actuating-bar.

23. In a linotype-machine, an assembler wherein the matrices are successively received and alined, a slide therein to resist the incoming matrices and subsequently expel the completed line, and a dash-pot connected to said slide to control its speed.

24. In a linotype-machine, the line-support G and a movable assembler arranged to aline with said support to deliver the matrices thereto, in combination with a slide to expel the matrices from the assembler, and a sliding bar $e^{16}$, provided with a vertically-movable finger I, for the double purpose of confining the incoming line and delivering the line subsequent to the casting operation.

25. In a linotype-machine, the horizontally-movable assembler, the line-support G arranged to receive the assembled matrices therefrom, the finger I, and means for moving said finger horizontally and vertically, as described, whereby it is caused to confine the incoming line at the front and subsequently to act behind the line and carry the same out of the support.

26. In a linotype-machine and in connection with a support G for sustaining the matrix-line before the mold, the reciprocating bar or slide $e^{16}$, the vertically-movable finger I carried thereby, and a switch $g^4$, whereby the finger is caused to pass backward over the line.

27. In a linotype-machine and in combination with a mold movable to and from the composed line of matrices, a line-support G fixed against horizontal motion and open at both ends, means for carrying the composed line into the support from one end, and means for delivering the line from the support at the opposite end, subsequent to the casting action.

28. In a linotype-machine, the combination of a pot, movable to and from the mold, a mold, movable to and from the matrix-line and having lips to embrace the line, a line-support, fixed against horizontal motion and open at both ends, and means for introducing the composed line to the support from one end and delivering it from the opposite end.

29. In a linotype-machine, a line-support, having vertical movement only, in combination with a mold, movable to and from the support to coöperate with the matrix-line therein, means for introducing the line of matrices to the support in one direction, and means for continuing the movement of the line to deliver it from the support.

30. In a linotype-machine, the vertically-movable support G, for the matrix-line, in combination with a lifting-spring and a depressing device, whereby the spring is caused to aline the ears of the contained matrices with yielding pressure against the mold and means for depressing the support G, whereby the matrices are positively relieved from pressure against the mold.

31. In a linotype-machine, the combination of a vertically-movable line-support, a vertically-movable justifying-bar J, and a lever $j'$, arranged to operate both of said parts.

32. The combination of the bar J, the actuating-lever $j'$, arranged to raise and lower said bar, the vertically-movable line-support G, loosely engaging the lever to be depressed thereby, and a spring $g^2$, acting to lift the line-support.

33. In a linotype-machine, a matrix-line support G, fixed against horizontal motion, and means for introducing the composed line endwise into said support, in combination with a horizontally-movable mold, having end lips to embrace the matrix-line.

34. In a linotype-machine, means for advancing a composed line of matrices endwise, first to the casting position, and thereafter in the same line to a point beyond the casting position, in combination with a coöperating mold, movable to and from the matrix-line and having end lips to embrace the latter, whereby the confinement of the line endwise is effected without movement of the line for the purpose.

35. In a linotype-machine, in combination with a horizontal support and guide for sustaining the line of matrices and spacers, means for delivering the line endwise therefrom, and independent means for receiving and carrying away the matrices and spacers respectively.

36. In a linotype-machine, means for sustaining the line before the mold, means for delivering the line endwise therefrom, a movable elevator or carrier to receive and engage the matrices when so delivered, and a space-carrier arranged to receive the spacers at the same time.

37. In a linotype-machine, the combination of a line-support G, an elevator W for receiving and transferring the matrices, a carrier V to receive and transfer the spacers, and means for imparting differential motion to the elevator and carrier, whereby the matrices and spacers are separated and thereafter transferred.

38. In combination with a matrix-line support G, a space-carrier V, arranged to close against the end of said support, a matrix-elevator W, arranged to close above the carrier, and means for pushing the matrix-line endwise out of the support, that the matrices may engage the elevator, and the spacers be engaged in the carrier.

39. In a linotype-machine, the combination of a line-support G, a carrier V to receive and sustain the spacers when delivered from the support means for delivering the spacers from the support to the carrier, a magazine for the spacers, and mechanism for moving the carrier from the support to the magazine and vice versa, whereby the return of the spacers after use to their magazine is effected.

40. In combination with the space-carrier V, its sustaining-arms mounted to turn about different centers and also to move vertically, whereby the spacers are received in one direction from the line and delivered in a different direction to their magazine.

41. In a linotype-machine, an elevator W, adapted to sustain the composed line of matrices, in combination with a twisted guide therefor, whereby the line is turned during its transportation.

42. In a linotype-machine, the combination of a matrix-line support and means for delivering the line endwise therefrom, a distributing mechanism arranged to receive the matrix-line in a direction angular to that in which it is delivered from the support, and an intermediate elevator or carrier adapted to receive the line from the support and transfer it with a turning motion to the distributer.

43. In a linotype-machine, mechanism for assembling the matrices and mechanism for distributing the matrices in parallel lines, in combination with an intermediate casting mechanism at right angles thereto, means for turning the assembled line of matrices for presentation to the casting mechanism, and means for receiving the line from the casting mechanism and turning the same for presentation to the distributer.

44. In a linotype-machine, the combination of an assembler mechanism, a casting mechanism at right angles thereto, and a distributing mechanism parallel therewith, means for turning the matrix-line in one direction for presentation to the casting mechanism, and means for turning the line in the reverse direction for presentation to the distributing mechanism, whereby the matrices are caused to face at all times in the proper direction.

45. In combination with the carrier V, the supporting-arms $v$ and $v'$, arranged to swing about different centers, a gear connecting them, and a shaft $v^3$ having both rotary and longitudinal movements.

46. In combination with the matrix-elevator W, its twisted guide $w$, the flexible lifting connection $w^3$, and means for operating the same.

47. In a linotype-machine, in combination with a matrix-elevator W and the twisted guide whereon it slides, an operating-lever $w^6$ and a lifting-chain having its ends connected respectively to the elevator and the lever and extended around intermediate guides, whereby the motion of the lever is multiplied and a long movement imparted to the elevator.

48. In combination with the mold-supporting arm and its supporting-shaft, the pitman, its operating-crank, and a stop-motion gear for imparting an intermitting oscillation to the mold.

49. In combination with a mold-carrying arm, its shaft mounted to slide axially, the rocking frame for sliding the shaft, the cam for actuating the same, and the intermediate spring through which yielding pressure is applied to the mold.

50. In combination with the sliding ejector, the link and lever for advancing the same, the rotary driving-crank, a latch mechanism through which the crank imparts motion to the lever, and means for tripping the latch out of engagement, whereby the rotary crank is adapted to move the lever and ejector the required distance and then release them.

51. In combination with the ejector, a rotary crank, an automatically-tripping latch, through which the crank imparts motion during a part of each revolution to the ejector, and a spring for returning the ejector.

52. In a linotype-machine, the combination of the ejector-operating lever $n'$, the revolving crank $n^2$, the latch or bolt $n^3$, and the tripping device $n^4$.

53. In a linotype-machine, the combination of the trimming-knives, an ejector for driving the slug between and beyond the knives, and a chute O, having a shoulder or offset $o$ to effect the reversal of the falling slug.

54. In a linotype-machine, the combination of a chute O, having a shoulder or offset $o$, a galley into which the chute discharges, and means for delivering the linotypes successively in an upright position into the chute, whereby their reversal is effected during their passage to the galley.

55. In a linotype-machine, the combination of a mold-carrier, a knife to trim the base of the slug at the back of the mold, and a knife-support, bearing on the front face of the mold-carrier, whereby the knife is held in contact with the mold during the trimming operation.

56. The combination of the turning mold-carrier H, the knife S, a knife-support $a$, and an antifriction-roller M, attached to said support and bearing on the mold-carrier in opposition to the knife.

57. In a linotype-machine, having the assembling and the casting mechanisms arranged at right angles to each other, the swinging pot, and the cam-shaft for operating the pot and its pump, in combination with the main shaft at right angles thereto, and intermediate driving-gear.

58. In a linotype-machine, the combination of assembling, casting and distributing mechanisms with supports for the matrix-line, adapted to turn the composed line from its original position to a different position for presentation to the casting mechanism, and again turning the line that it may face in the original direction for presentation to the distributing mechanism.

59. In a linotype-machine, means for turning the composed line of matrices to a position at right angles to that in which it was composed, and thereafter turning it to face in its original position.

In testimony whereof we hereunto set our hands, this 22d day of December, 1902, in the presence of two attesting witnesses.

DAVID A. POE.
WILLIAM H. SCHARF.

Witnesses:
HAROLD J. RULE,
E. W. H. PHILLIPS.